United States Patent [19]

DeBaun

[11] 4,052,897
[45] Oct. 11, 1977

[54] METHODS AND APPARATUS FOR DETERMINING TOTAL FLOW RATE OF GASEOUS FLUIDS

[75] Inventor: Kenneth W. DeBaun, Santa Rosa, Calif.

[73] Assignee: Air Monitor Corporation, Santa Rosa, Calif.

[21] Appl. No.: 736,327

[22] Filed: Oct. 28, 1976

[51] Int. Cl.² .............................................. G01F 1/46
[52] U.S. Cl. ................................................. 73/212
[58] Field of Search ............................. 73/195, 212

[56] References Cited

U.S. PATENT DOCUMENTS

| | | | |
|---|---|---|---|
| 2,800,017 | 7/1957 | Ruelland | 73/195 |
| 3,981,193 | 9/1976 | Goulet | 73/212 |

*Primary Examiner*—Herbert Goldstein

[57] ABSTRACT

Methods and apparatus for determining the total flow rate of gaseous fluid passing through a plurality of conduits utilizing a plurality of total and static pressure sensing probes, the number of total pressure sensing probes being selected and deployed within each conduit to cover cross-sectional areas of substantially equal and corresponding size, each total pressure sensing probe being connected to one central pressure averaging manifold and each static sensing probe being connected to a second pressure averaging manifold, the pressure difference between the two pressure averaging manifolds being compared to determine the pressure difference as a measure of average velocity.

In addition, the fluid flow to and from each manifold is controlled, as by means of a restriction, to impede the flow while providing a substantially laminar flow and a Reynolds number less than 4,000.

10 Claims, 1 Drawing Figure

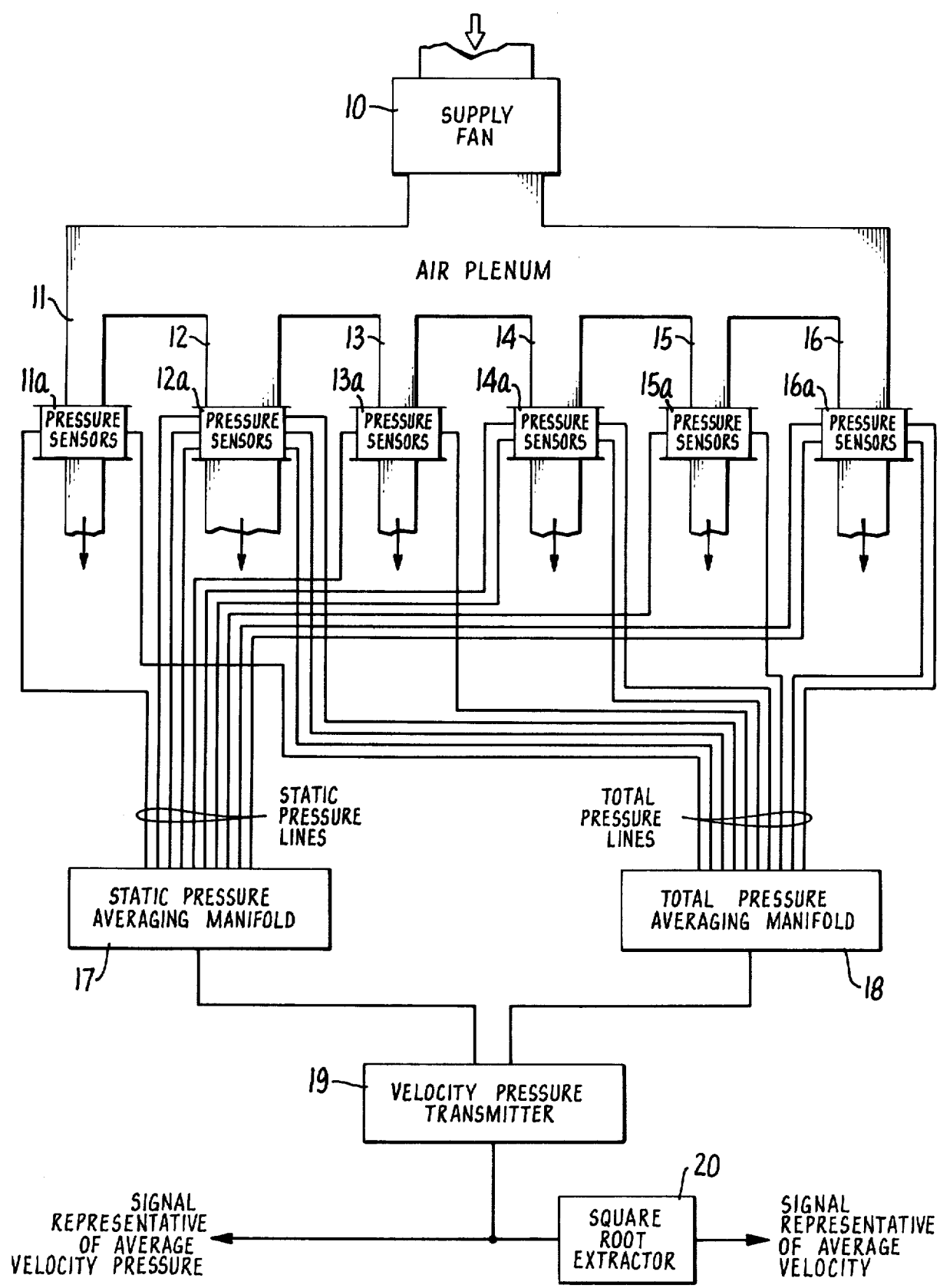

METHODS AND APPARATUS FOR DETERMINING TOTAL FLOW RATE OF GASEOUS FLUIDS

This application relates to methods and apparatus for determining the average velocity and total volume flow rate of gaseous fluid passing through a plurality of conduits.

It is common practice to employ air flow measuring stations such as those described in U.S. Pat. No. 3,685,355 for determining flow rates through a single conduit. However, there is an increasing need to measure, monitor and control the total air flow in commercial and industrial systems having a plurality of conduits; and there are many air flow measuring applications where it is desirable to measure flows in each separate fan or air system and then compute an overall or total volume air flow. The present invention is directed to improvements in methods and apparatus for measuring gaseous fluid flows in such systems and applications.

Several methods for measuring and totalizing flow of volumes are presently used. Perhaps the most commonly employed methods utilize constant volume displacement devices, such as gas meters, together with totalizing counters. But the capacities of such devices are extremely limited and, therefore, are not considered applicable to systems which move significantly larger volumes of air.

Another method for measuring and totalizing air flow volumes requires the use of pneumatic pressure sensors, differential pressure transducers-transmitters and multiple electronic computers. These devices have no limitations as to air flow volumes or air flow velocities; however, the total cost of manufacture, installation and calibration is high and, for that reason, they have limited application.

The present invention utilizes conventional pressure sensors but novel methods and apparatus for totalizing the flow rates (velocity and volume) in a plurality of conduits. In general, the total and static pressures of each conduit are initially sensed using a plurality of total and static pressure sensing probes. The number of probes employed for each conduit are selected and deployed within the conduits to cover cross-sectional areas of substantially equal and corresponding size. The total pressure sensing probes of each conduit are connected by headers and tubing to one of two pressure averaging manifolds, the static pressure sensing probes of each conduit being connected to the other manifold by other headers and tubing. The average total pressure of one manifold and the average static pressure of the other manifold are then compared to determine the pressure difference. That difference, it has been found, is an accurate reflection of an average velocity (and total flow rate) so long as the fluid flow throughout the sensing system is substantially laminar and provided that pressure venting (or bleeding) from the system is essentially avoided.

In a preferred form of the invention, the compared pressure difference between the central averaging manifolds is amplified and converted to a signal that is linear to the average flow rate, and that signal is used in feedback circuitry to control fans or other equipment.

One subject of the present invention is to provide novel methods and apparatus for determining an average velocity and the total flow of gaseous fluid passing through a plurality of conduits utilizing a pair of pressure averaging manifolds.

A second object of the invention is to provide relatively inexpensive but accurate methods and apparatus for determining an average velocity of gaseous fluid passing through a plurality of conduits and then computing a total volume flow rate.

Other objects of this invention will become apparent in view of the following detailed description and the accompanying drawing, which schematically and diagrammatically illustrates a preferred embodiment of the invention.

In the drawing forming a part of this application is illustrated a supply fan 10 which distributes air through a plurality of six branch conduits 11, 12, 13, 14, 15 and 16. All of the conduits may be of different sizes (having different cross-sectional areas) and other inherent differences affecting flow rates. For purposes of illustration, however, it is assumed that conduit 12 has a cross-sectional area three times that of conduits 11, 13 and 15; and the area of conduits 14 and 16 are twice the size of conduits 11, 13 and 15. Each conduit or air duct contains an air flow measuring station 11a through 16a, respectively. Each station comprises a plurality of total and static pressure sensing probes selected in number and deployed to provide an average static pressure and an average total pressure for each conduit. This is accomplished utilizing apparatus as described in U.S. Pat. No. 3,685,355. A computation of total flow rate as contemplated by this invention further requires that the total pressure sensing probes for each conduit be selected in number and deployed to cover substantially equal cross-sectional areas within each conduit.

The area size covered by each total sensing probe is determined by studying sizes and cross-sectional area of all conduits and then selecting an area that is essentially common to all conduits, using the least number of probes suitable for the particular air flow system analyzed. These calculations are primarily a matter of searching for the "equal area section" that is evenly divisible into the total cross-sectional area of each conduit, and which requires the least number of probes for each conduit. The selection of an "equal area section" for pressure probes of a single conduit is, of course, known and utilized by persons of ordinary skill in the art of measuring air flows.

In accordance with the present invention, one or more total and static pressure headers connect the pressure sensing probes of "equal area sections" of each sensing station, and conventional tubing is used to connect the headers of equal area sections to central averaging manifolds 17 and 18. One manifold is provided for all static pressure headers and the other manifold connects to all total pressure headers. It will be apparent that a greater number of headers and tubing connections are required when connecting the central averaging manifolds to the larger conduits. In general, the number of headers and connections used for specific conduits will be in direct proportion to the cross-sectional areas of the conduits.

The foregoing method and apparatus, it has been learned, independently averages the total pressure and static pressure signals coming from equal area sections of multiple air flow measuring stations. The use of multiple velocity sensing headers within each air flow measuring station ensures that each set of pressure signals (total and static) has the same weighted equal area factor as other signals, thereby permitting their being averaged. Nevertheless, the application of total and static pressure signals from a plurality of air flow measuring stations may introduce several variables, each of which might alter the theoretical averaging action. These variables are as follows:

1. the possible bleeding of high pressure input signals from the central averaging manifolds into the input signal tubing connecting the manifold to lower pressure signals;
2. variations in length or size of the tubing which is used to connect the air flow measuring stations to the central averaging manifolds, particularly if the chambers of the central averaging manifold are being bled or vented toward lower pressure signals;
3. the possible pressure venting back through the air flow measuring stations themselves, and the restrictive effect, if any, caused by the openings to the sensors;
4. the possible pressure venting of the signals from the air flow measuring stations; and
5. the possible pressure venting from the central averaging manifolds when connected to a velocity pressure transmitter, particularly one having a protective air purge.

Various tests have shown that a selection of materials and sizing in accordance with conventional practices will obviate any of the problems which could alter the theoretical averaging action. As indicated, it is a purpose of this invention to have the averaging occur in the central averaging manifolds. If the ports to the central averaging manifolds, or if the connecting tubing and the manifold sensors of the air flow measuring stations are too large, improper or partial averaging will occur. In short too much "openness" in the system will result in an obvious venting of the higher pressure before averaging occurs. It may be necessary, therefore, to add an impedance or restriction to the flow system. The installation of an orifice or nozzle at the connecting ports to the central averaging manifolds may be used to accomplish this purpose. At the same time, it is desirable to maintain a laminar flow of gaseous fluids throughout the system. Thus, it is necessary to properly select a tubing size for connecting the air flow measuring stations to the central averaging manifolds and to insert necessary restrictions selected to yield fluid flows having a Reynolds number less than 4,000 and preferably between 2,000 and 4,000.

Tests and calculations have shown that 3/8 inch OD tubing (1/4 ID) may be used statisfactorily for connecting the pressure headers of each air flow measuring station to the central averaging manifold. However, the additional use of an orifice or restriction at the inlets of the central averaging manifolds is desirable to avoid undesirable venting. It is believed that the maximum orifice size permissible to achieve proper averaging in the manifolds will provide an opening area of no more than 0.005 sq. in. A larger opening will create undesirable "openness" and result in inaccurate measurement except under a limited range of pressure conditions. The minimum orifice size, on the other hand, is limited by the conditions of laminar flow, which require that the Reynolds number not exceed 4,000.

The size of the central averaging manifolds may vary considerably, depending on the number of input signals to the manifold and the extreme variations possible between signals. It is currently believed, based on tests, that the central averaging manifolds should possess a volume of approximately six cubic inches per input signal; and it has been shown that such manifold volumes will produce accurate readings despite extreme variations in pressure signals. Other tests have shown that the counter flow produced by a protective air purge of 0.05 SCFH from a velocity pressure transmitter connected to a central averaging manifold does not appreciably affect its averaging capability.

In a preferred embodiment, the total pressure signal of one manifold and static pressure signal of the other are sent to a velocity pressure transmitter 19 for amplification into a three to fifteen PSIG control signal which is linear to velocity pressure. An output signal from transmitter 19 may then be sent to a square root extractor 20 to obtain a further signal which is linear to the average flow velocity. The resulting signal may then be used to control air flow, to operate a recorder read-out of average flow velocity or sent to a computer for determining total volume flow, etc.

Although a preferred embodiment of the invention has been illustrated and described, various modifications and changes may be resorted to without departing from the spirit of the invention and the scope of the appended claims, and each of such modifications and changes is contemplated.

What is claimed is:

1. A method for determining the total flow rate of gaseous fluid passing through a plurality of conduits comprising the steps:
    sensing the total and static pressures in each conduit using a plurality of total and static pressure sensing probes, the number of total pressure sensing probes utilized in each conduit being selected and deployed to cover cross-sectional areas of substantially equal size,
    connecting the total pressure sensing probes of all conduits to one pressure averaging manifold,
    connecting the static pressure sensing probes of all conduits to a second pressure averaging manifold,
    then comprising the pressure difference between the average total pressure of the one manifold with the average static pressure of the second manifold to determine the pressure difference.

2. The method of claim 1, and further wherein the fluid flow to and from each manifold is controlled to provide a substantially laminar flow with a Reynolds number less than 4,000.

3. The method of claim 1, and further wherein the fluid flow from each manifold is controlled using a restriction that impedes the flow of fluid from the manifold toward those pressure sensing probes receiving pressure signals lower than the pressure within the connecting manifold.

4. The method of claim 3, and further wherein the size and shape of the restrictions are seleced to yield fluid flows having a Reynolds number between 2,000 and 4,000 therethrough.

5. The method of claim 1, and further wherein the compared pressure difference is amplified and converted to a signal that is linear to total flow rate.

6. Apparatus for use in determining the total flow of gaseous fluid passing through a plurality of conduits comprising:
    a plurality of pressure sensing stations, one station being provided for each conduit, each station including a plurality of total and static pressure sensing probes, the number of total pressure sensing probes being selected and located within the conduits to cover substantially equal cross-sectional areas, each total pressure sensing probe of one station covering approximately the same cross-sectional area as covered by pressure sensing probes in other stations;

means connecting the total pressure sensing probes for the plurality of pressure sensing stations to a first pressure averaging manifold;

means connecting the static pressure sensing probes of the plurality of pressure sensing stations to a second pressure averaging manifold;

and means for comparing the pressure difference between the first pressure averaging manifold and said second pressure averaging manifold to determine the pressure difference.

7. The apparatus of claim 6, said total and static pressure sensing probes being connected to said first and second manifolds by tubing selected to provide a fluid flow between each pressure probe and manifold which is substantially laminar and having a Reynolds number less than 4,000.

8. The apparatus of claim 6, the connection between each pressure probe and manifold including a restriction that impedes the flow of fluid from the manifold, the size and shape of the restrictions being selected to yield fluid flows having a Reynolds number between 2,000 and 4,000 therethrough.

9. The apparatus of claim 7, the connection between each pressure probe and manifold including a restriction that inhibits the flow of fluid from the manifold, the opening area of said restriction being 0.005 sq. in. or less.

10. The apparatus of claim 6, said first and second pressure averaging manifolds having internal volumes of approximately 6N cubic inches, where N is the number of input signals to each manifold.

* * * * *